United States Patent
Tsai et al.

(10) Patent No.: US 8,031,423 B1
(45) Date of Patent: Oct. 4, 2011

(54) DISK DRIVE GENERATING ACTUAL DATA TPI PROFILE BY COMBINING SEGMENTS OF PREDETERMINED DATA TPI PROFILES

(75) Inventors: Chun Sei Tsai, Tustin, CA (US); Stephany W. Kwan, Rowland Heights, CA (US); Kameron Kam-Wai Jung, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 102 days.

(21) Appl. No.: 12/492,443

(22) Filed: Jun. 26, 2009

(51) Int. Cl.
*G11B 5/09* (2006.01)

(52) U.S. Cl. .......................................... 360/48

(58) Field of Classification Search ................ 360/48, 360/53, 31, 75, 69, 76, 77.02, 77.07, 78.08, 360/135; 711/4; 714/704
See application file for complete search history.

(56) References Cited

U.S. PATENT DOCUMENTS

| | | | | |
|---|---|---|---|---|
| 4,669,004 A | * | 5/1987 | Moon et al. | 360/53 |
| 4,771,346 A | * | 9/1988 | Shoji et al. | 360/15 |
| 4,928,192 A | * | 5/1990 | Bartlett et al. | 360/77.08 |
| 4,945,427 A | | 7/1990 | Cunningham | |
| 5,596,458 A | | 1/1997 | Emo et al. | |
| 5,739,994 A | | 4/1998 | Ottesen et al. | |
| 5,777,813 A | * | 7/1998 | Sun et al. | 360/66 |
| 5,812,755 A | | 9/1998 | Kool et al. | |
| 5,870,237 A | | 2/1999 | Emo et al. | |
| 5,930,069 A | | 7/1999 | Kim | |
| 5,940,237 A | | 8/1999 | Takagi | |
| 5,949,603 A | | 9/1999 | Brown et al. | |
| 5,956,196 A | | 9/1999 | Hull et al. | |
| 6,005,725 A | | 12/1999 | Emo et al. | |
| 6,052,250 A | | 4/2000 | Golowka et al. | |
| 6,084,738 A | | 7/2000 | Duffy | |
| 6,091,559 A | | 7/2000 | Emo et al. | |
| 6,105,104 A | | 8/2000 | Guttmann et al. | |
| 6,118,604 A | | 9/2000 | Duffy | |
| 6,130,796 A | | 10/2000 | Wiselogel | |
| 6,137,644 A | | 10/2000 | Hetzler et al. | |
| 6,172,839 B1 | | 1/2001 | Ahn | |
| 6,182,250 B1 | | 1/2001 | Ng et al. | |
| 6,195,218 B1 | | 2/2001 | Guttmann et al. | |
| 6,235,934 B1 | * | 5/2001 | Caringi et al. | 564/241 |
| 6,256,160 B1 | | 7/2001 | Liikanen et al. | |
| 6,262,857 B1 | | 7/2001 | Hull et al. | |
| 6,317,285 B1 | | 11/2001 | Bi et al. | |
| 6,396,654 B2 | | 5/2002 | Jeong et al. | |
| 6,441,981 B1 | | 8/2002 | Cloke et al. | |
| 6,466,387 B1 | | 10/2002 | Ogasawara et al. | |
| 6,493,176 B1 | | 12/2002 | Deng et al. | |
| 6,545,836 B1 | | 4/2003 | Ioannou et al. | |
| 6,560,052 B2 | | 5/2003 | Ng et al. | |
| 6,751,036 B2 | | 6/2004 | Quak et al. | |

(Continued)

OTHER PUBLICATIONS

U.S. Appl. No. 12/340,309 to Tsai et al., filed Dec. 19, 2008, 28 pages.

(Continued)

*Primary Examiner* — Fred Tzeng

(57) ABSTRACT

A disk drive is disclosed comprising a head actuated over a disk having a plurality of data tracks. An ideal data tracks per inch (TPI) profile is determined for the disk, and an actual data TPI profile is generated that estimates the ideal data TPI profile by combining a first segment of a first predetermined data TPI profile and a second segment of a second predetermined data TPI profile.

14 Claims, 7 Drawing Sheets

U.S. PATENT DOCUMENTS

| | | | |
|---|---|---|---|
| 6,765,737 B1 | 7/2004 | Lim et al. | |
| 6,765,744 B2 | 7/2004 | Gomez et al. | |
| 6,778,343 B2 | 8/2004 | Nunnelley | |
| 6,943,972 B1 | 9/2005 | Chue et al. | |
| 6,950,256 B2 | 9/2005 | Kadokawa | |
| 6,956,710 B2 | 10/2005 | Yun et al. | |
| 6,957,379 B1* | 10/2005 | Patapoutian et al. | 714/774 |
| 6,969,989 B1 | 11/2005 | Mei | |
| 7,012,773 B2 | 3/2006 | Ashikaga et al. | |
| 7,031,095 B2* | 4/2006 | Kim et al. | 360/77.02 |
| 7,046,471 B2* | 5/2006 | Meyer et al. | 360/75 |
| 7,075,743 B2 | 7/2006 | Nishida et al. | |
| 7,110,197 B2 | 9/2006 | Cho | |
| 7,113,358 B2 | 9/2006 | Zayas et al. | |
| 7,145,740 B2 | 12/2006 | Zayas et al. | |
| 7,170,700 B1 | 1/2007 | Lin et al. | |
| 7,215,514 B1 | 5/2007 | Yang et al. | |
| 7,414,808 B2* | 8/2008 | Cho et al. | 360/75 |
| 7,436,610 B1 | 10/2008 | Thelin | |
| 7,463,438 B2 | 12/2008 | Kosugi et al. | |
| 7,679,851 B1* | 3/2010 | Sun et al. | 360/48 |
| 7,688,540 B1* | 3/2010 | Mei et al. | 360/76 |
| 2002/0039246 A1 | 4/2002 | Ding et al. | |
| 2004/0021975 A1* | 2/2004 | Meyer et al. | 360/75 |
| 2004/0136104 A1* | 7/2004 | Chiao et al. | 360/31 |
| 2004/0179292 A1 | 9/2004 | Zayas et al. | |
| 2006/0018051 A9* | 1/2006 | Chiao et al. | 360/31 |
| 2006/0164747 A1 | 7/2006 | Lee | |
| 2006/0227445 A1 | 10/2006 | Chiao et al. | |
| 2007/0064325 A1 | 3/2007 | Bi et al. | |
| 2007/0127150 A1 | 6/2007 | Cho et al. | |
| 2010/0165496 A1* | 7/2010 | Bergevin | 360/31 |

OTHER PUBLICATIONS

Office Action dated Sep. 28, 2010 from U.S. Appl. No. 12/340,309, 23 pages.

Office Action dated Jan. 26, 2011 from U.S. Appl. No. 12/340,309, 14 pages.

Notice of Allowance dated Mar. 31, 2011 from U.S. Appl. No. 12/340,309, 7 pages.

* cited by examiner

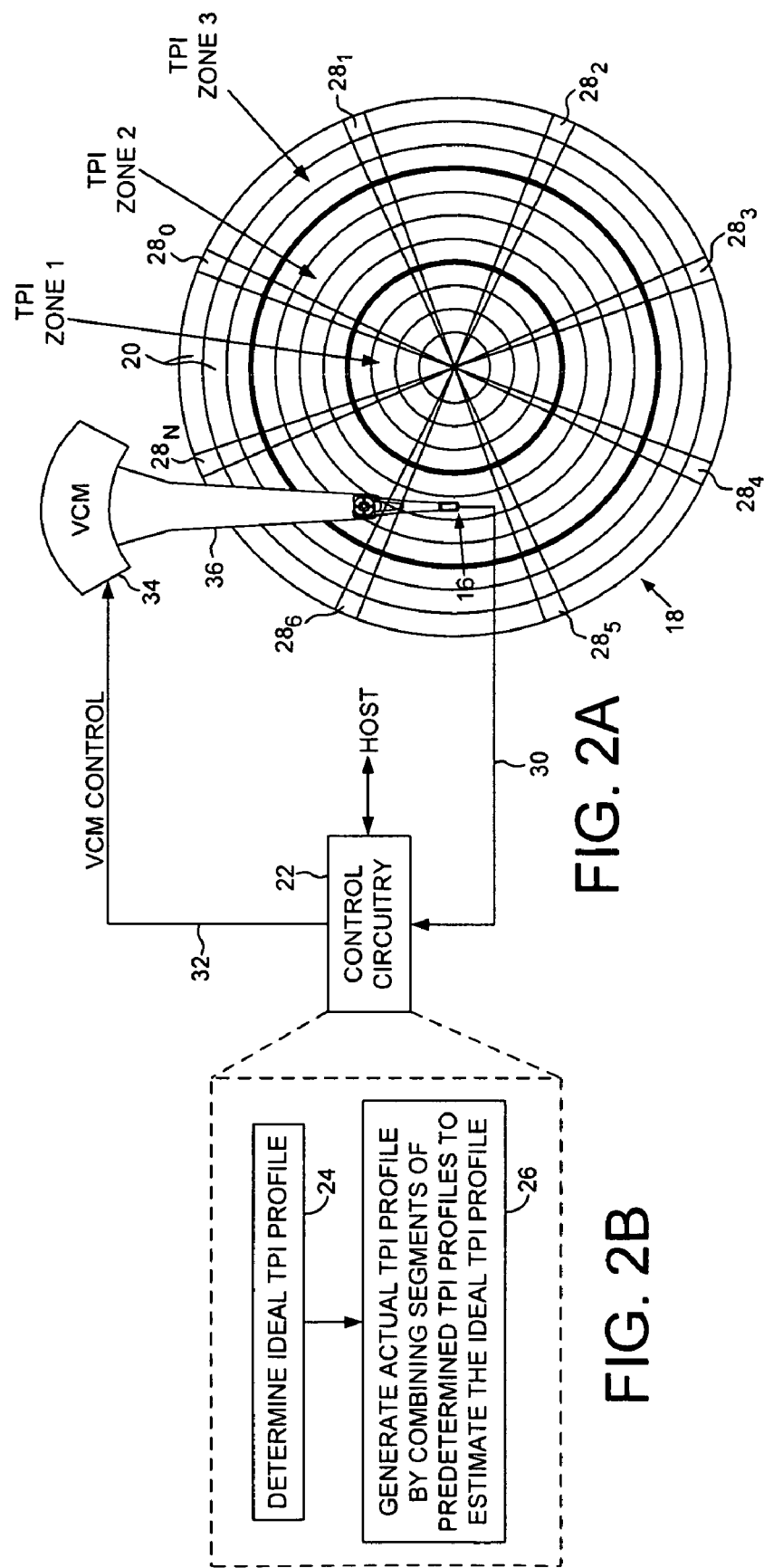

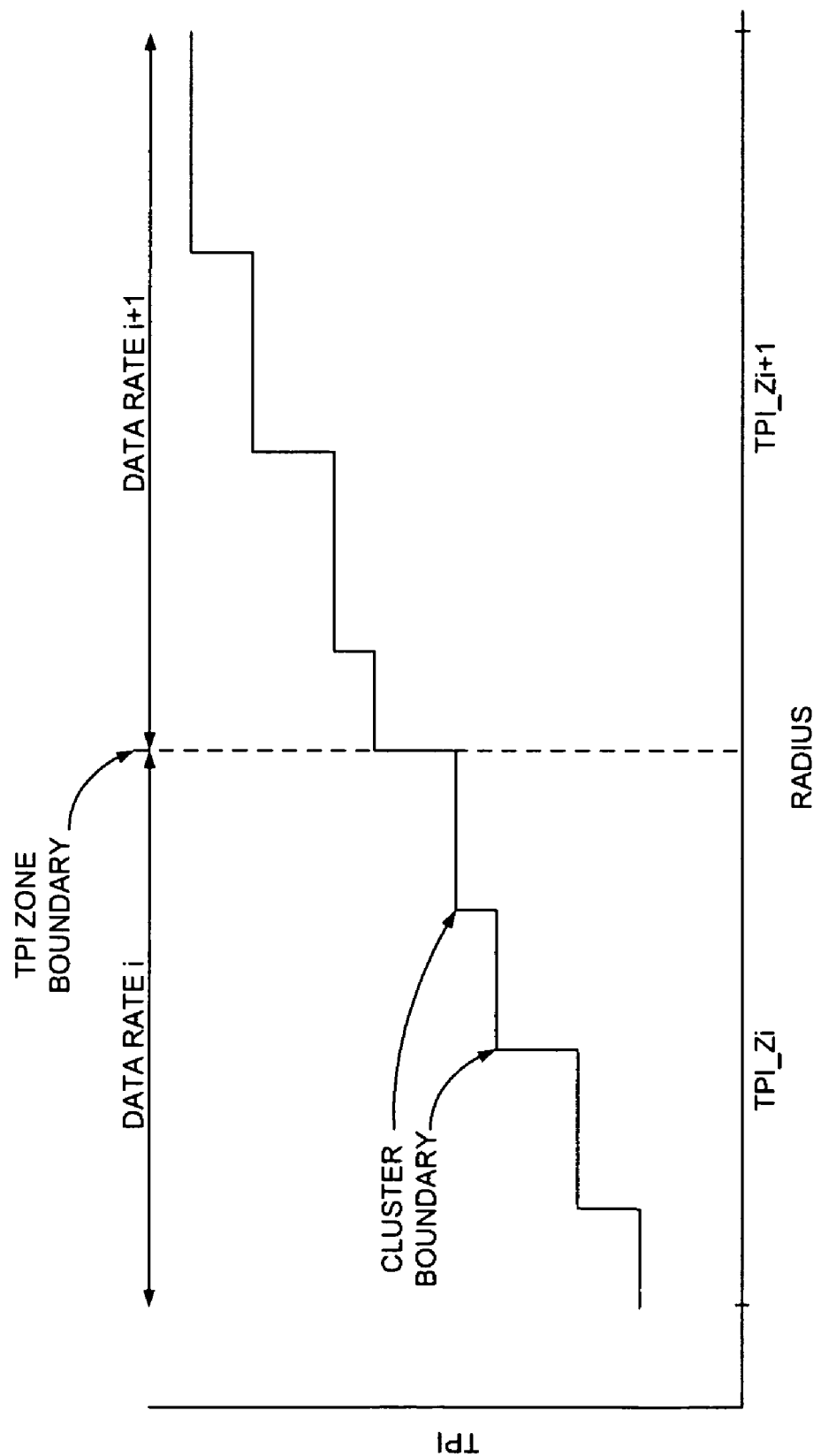

US 8,031,423 B1

DISK DRIVE GENERATING ACTUAL DATA TPI PROFILE BY COMBINING SEGMENTS OF PREDETERMINED DATA TPI PROFILES

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric data tracks for recording user data sectors and embedded servo sectors. The embedded servo sectors comprise head positioning information (e.g., a track address) which is read by the head and processed by a servo controller to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

SUMMARY OF EMBODIMENT OF THE INVENTION

A disk drive is disclosed comprising a head actuated over a disk having a plurality of data tracks. An ideal data tracks per inch (TPI) profile is determined for the disk, and an actual data TPI profile is generated that estimates the ideal data TPI profile by combining a first segment of a first predetermined data TPI profile and a second segment of a second predetermined data TPI profile.

BRIEF DESCRIPTION OF THE DRAWINGS

FIG. 2A shows a disk drive according to an embodiment of the present invention comprising a head actuated over a disk, and control circuitry.

FIG. 2B is a flow diagram executed by the control circuitry according to an embodiment of the present invention wherein an actual data tracks per inch (TPI) profile is generated by combining segments of predetermined data TPI profiles.

FIG. 4 shows an embodiment of the present invention wherein a predetermined data TPI profile comprises a plurality of TPI zones, wherein each TPI zone comprises a plurality of TPI segments having a constant TPI across the TPI segment.

DETAILED DESCRIPTION OF EMBODIMENTS OF THE INVENTION

Figure 1:
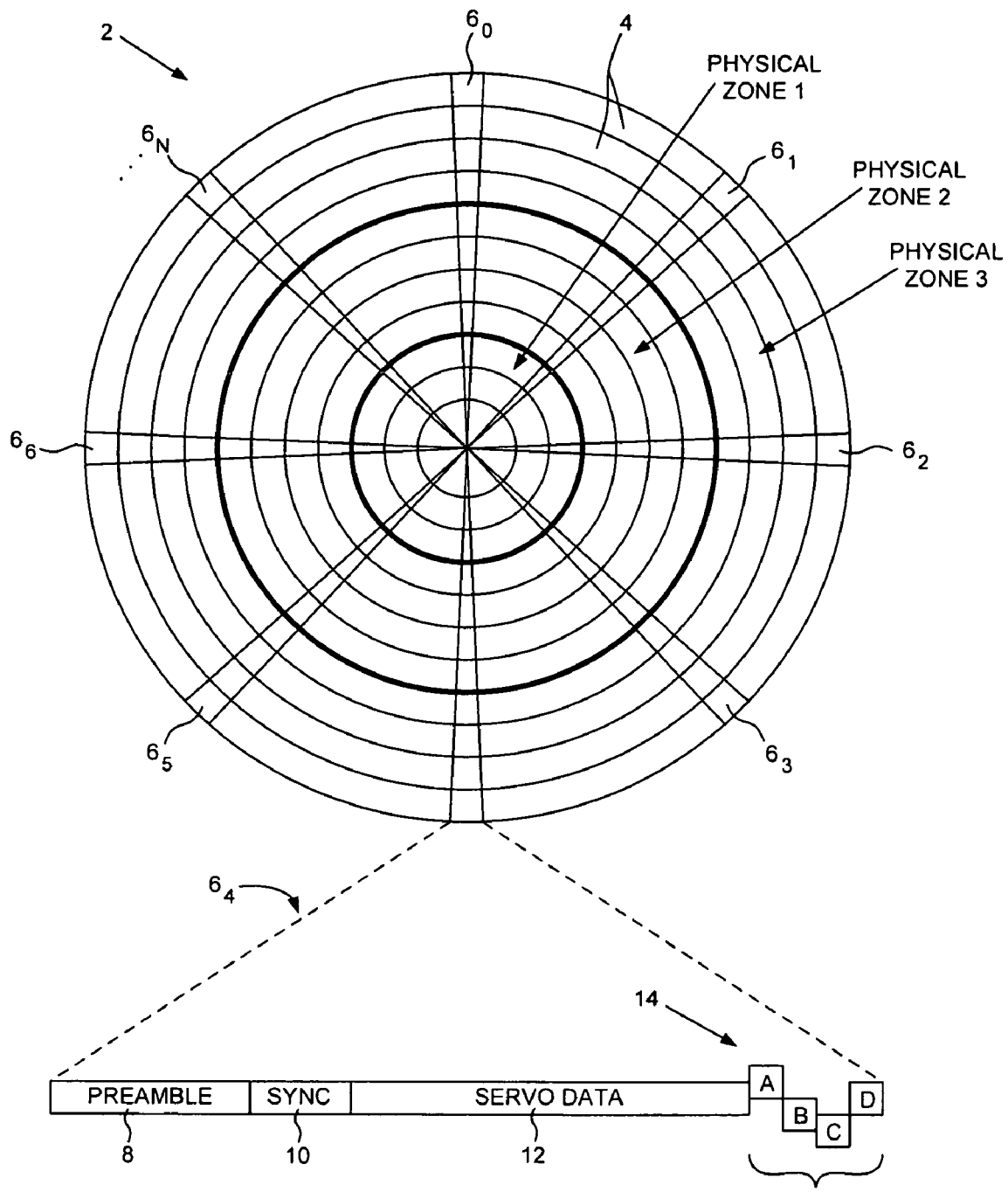
FIG. 1 shows a prior art disk format comprising a plurality of data tracks defined by embedded servo sectors.

FIG. 2A shows a disk drive according to an embodiment of the present invention comprising a head 16 actuated over a disk 18 having a plurality of data tracks 20, and control circuitry 22 operable to execute the flow diagram of FIG. 2B. An ideal data tracks per inch (TPI) profile is determined for the disk (step 24), and an actual data TPI profile is generated that estimates the ideal data TPI profile by combining a first segment of a first predetermined data TPI profile and a second segment of a second predetermined data TPI profile (step 26).

In the embodiment of FIG. 2A, the disk 18 comprises a plurality of servo sectors $28_0$-$28_N$ that define the plurality of data tracks 20. The control circuitry 22 processes a read signal 30 emanating from the head 16 to demodulate the servo sectors $28_0$-$28_N$ into a position error signal (PES). The PES is filtered with a suitable compensation filter to generate a control signal 32 applied to a voice coil motor (VCM) 34 which rotates an actuator arm 36 about a pivot in order to position the head 16 radially over the disk 18 in a direction that reduces the PES. The servo sectors $28_0$-$28_N$ may comprise any suitable position information, such as a track address for coarse positioning and servo bursts for fine positioning.

When an access command is received from the host (read or write command), the control circuitry determines the target data track for the access command, which may include determining the target disk surface and then the target track on the target disk surface. In one embodiment, defining a plurality of predetermined data TPI profiles facilitates the algorithm for mapping an access command into the target data track. In other words, the algorithm for mapping access commands can be configured according to each predetermined data TPI profile.

Figure 3A:
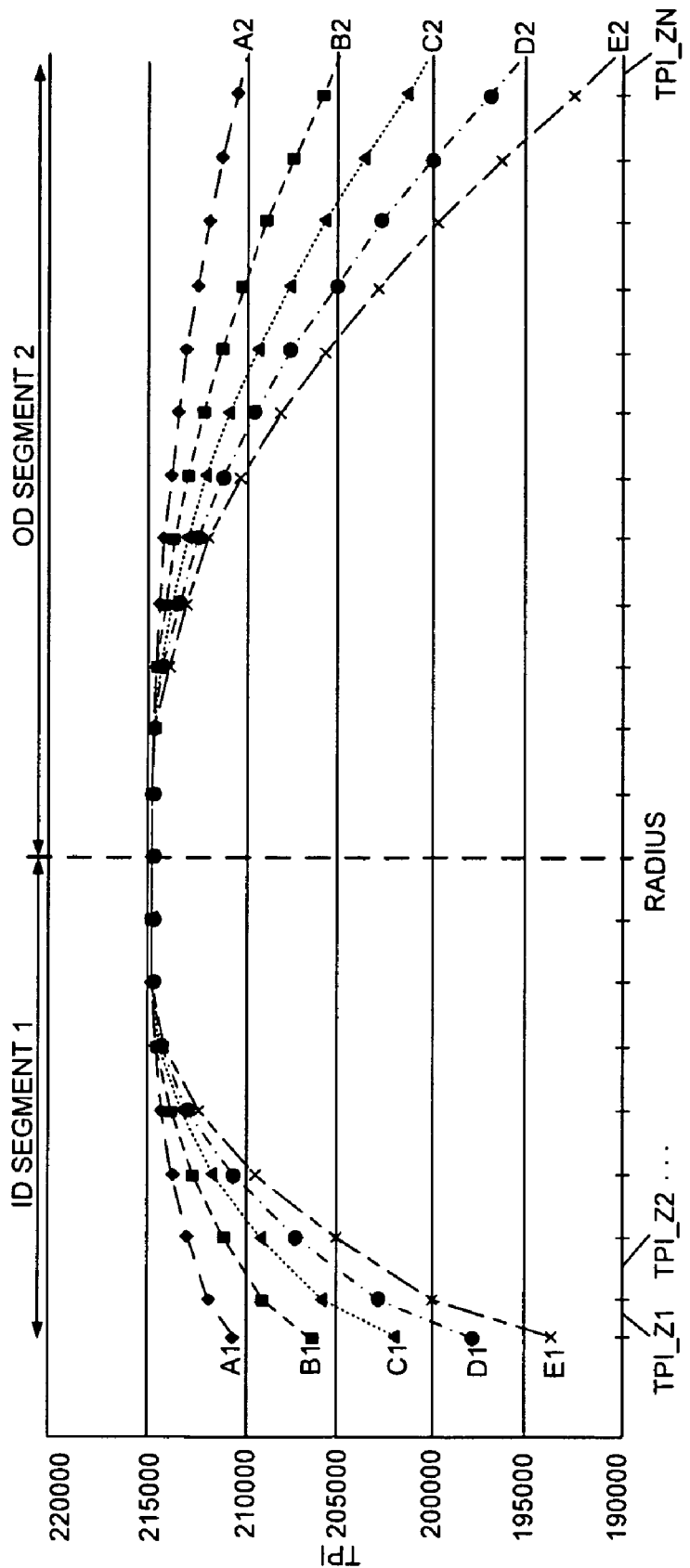
FIG. 3A shows example predetermined data TPI profiles divided into two segments which are combined to estimate an ideal data TPI profile across the radius of the disk.

FIG. 3A shows an embodiment of the present invention wherein five predetermined data TPI profiles (A-E) are defined across the radius of a disk surface. Depending on certain design criteria, such as optimal bit error rate as affected by the geometry of the head, an ideal data TPI profile can be determined across the radius of each disk surface. The predetermined data TPI profile that is closest to the ideal data TPI profile may then be selected as the actual data TPI profile for each disk surface.

Figure 3B:
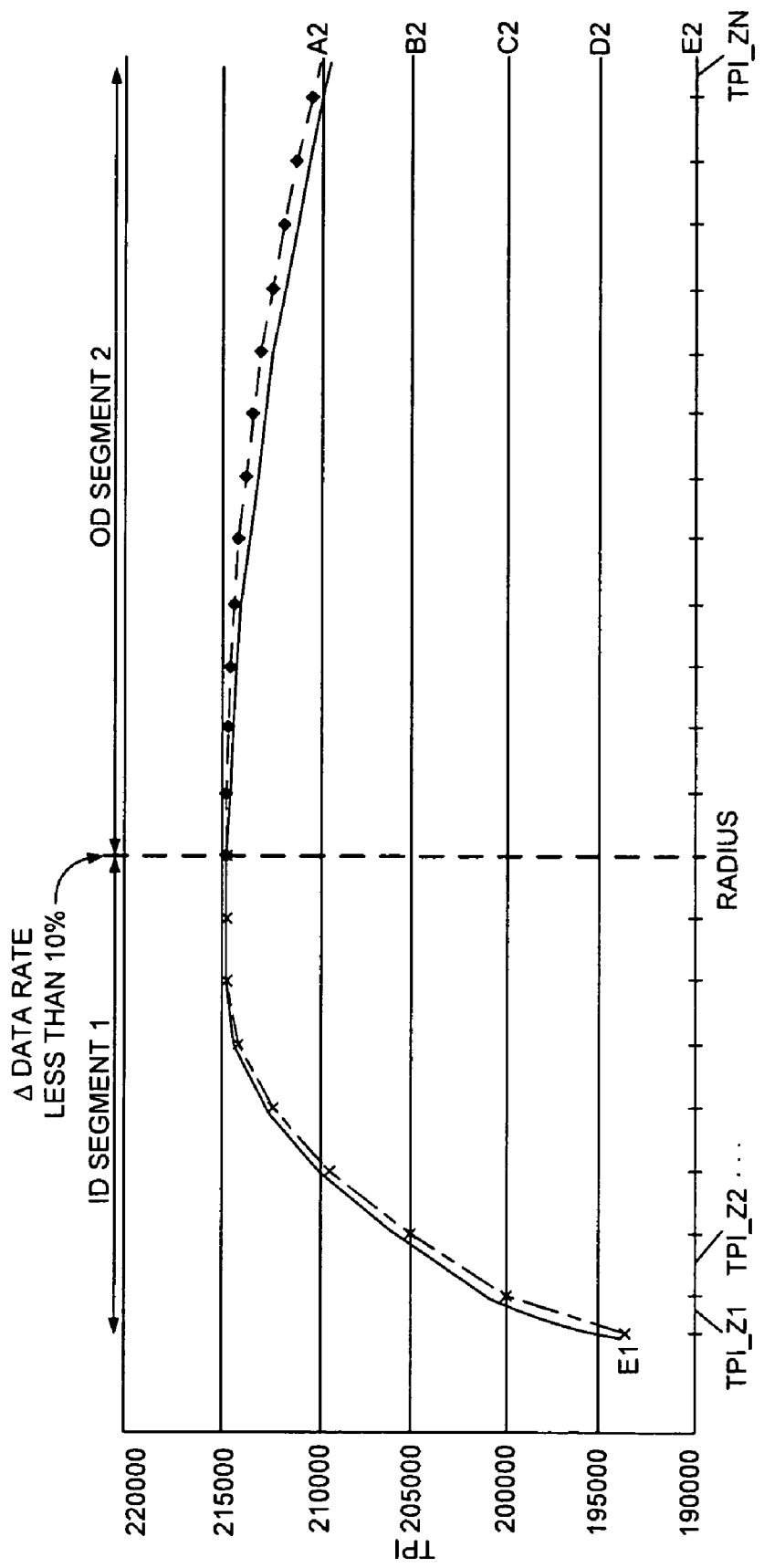
FIG. 3B shows an example ideal data TPI profile and two combined segments of the predetermined data TPI profiles that estimate the ideal data TPI profile.

In one embodiment, each of the predetermined data TPI profiles is divided into a plurality of segments, wherein in the embodiment of FIG. 3A, each predetermined data TPI profile is divided into two segments. The actual data TPI profile for each disk surface is then generated by combining the segments of the predetermined data TPI profiles in a manner which best estimates the ideal data TPI profile. This embodiment is illustrated in FIG. 3B which shows an ideal data TPI profile (solid line) and the corresponding actual data TPI profile (dashed line) generated by combining the first segment (E1) of the "E" predetermined data TPI profile with the second segment (A2) of the "A" predetermined data TPI profile.

Combining segments of predetermined data TPI profiles increases the number of available data TPI profiles to select from. In the example embodiment of FIG. 3A, the number of available data TPI profiles doubles from five (A-E) to twenty-five ($5^2$). In general, the number of available data TPI profiles that can be defined by combining different segments of N predetermined data TPI profiles is $N^j$ where j is the number of segments. Increasing the number of available data TPI profiles may result in a better match of the actual data TPI profile to the ideal data TPI profile.

In one embodiment, a predetermined data rate (linear bit density) is defined across each segment of the predetermined data TPI profiles such that there may be a change in the data rate at the segment boundaries. For example, in FIG. 3B there may be a change in the data rate at the boundary between segment E1 and A2. In one embodiment, the predetermined data TPI profiles are segmented at locations across the radius of the disk such that the change in the data rate across the segment boundaries is less than a predetermined threshold (e.g., less than 10% in the example of FIG. 3B).

In the embodiment of FIG. 2A, the disk 18 comprises a plurality of TPI zones, where each TPI zone defines a band of data tracks 20. The data rate (linear bit density) of the data tracks varies between the TPI zones, for example, increases toward the outer diameter TPI zones similar to the physical zones in the prior art disk format of FIG. 1. In an embodiment wherein the disk drive comprises multiple disk surfaces, the TPI zone boundaries may be different across the disk surfaces.

FIG. 4 shows an embodiment wherein each TPI zone comprises a plurality of TPI segments, wherein each TPI segment comprises a constant data TPI over a radial segment of the disk (i.e., over a plurality of the data tracks). In one embodiment, each TPI segment comprises one or more clusters that define a serpentine pattern for accessing the data tracks across multiple disk surfaces. As illustrated in FIG. 4, the boundaries of each TPI segment as well as the boundaries of each TPI zone align with a cluster boundary. Further details concerning clusters and the serpentine pattern they define are disclosed in U.S. Pat. No. 7,436,610 entitled "DISK DRIVE EMPLOYING DIFFERENT ZONE BOUNDARIES ACROSS DISK SURFACES" the disclosure of which is incorporated herein by reference.

Figure 5A:
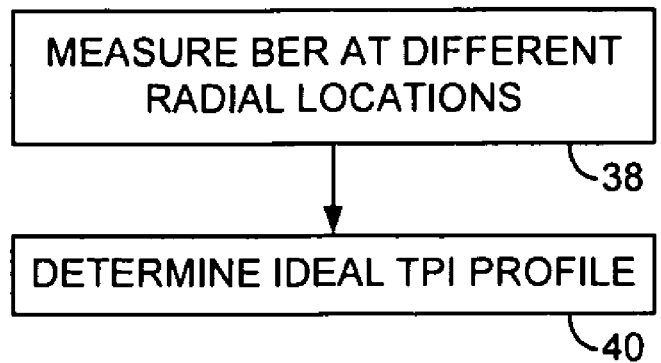
FIG. 5A shows a flow diagram according to an embodiment of the present invention wherein the ideal data TPI profile is determined by measuring a bit error rate at different radial locations.

The ideal data TPI profile may be determined for each disk surface using any suitable technique. FIG. 5A is a flow diagram according to an embodiment of the present invention wherein a bit error rate (BER) is measured at different radial locations (step 38). For example, a test pattern may be written over a plurality of adjacent tracks at a particular radial location and the bit error rate measured for varying data TPI settings. The data TPI setting that performs best (in terms of BER) is selected as a data point in the ideal data TPI profile. In one embodiment, this process is repeated at many different radial locations to establish data points across the radius of the disk to thereby define the ideal data TPI profile (step 40).

Figure 5B:
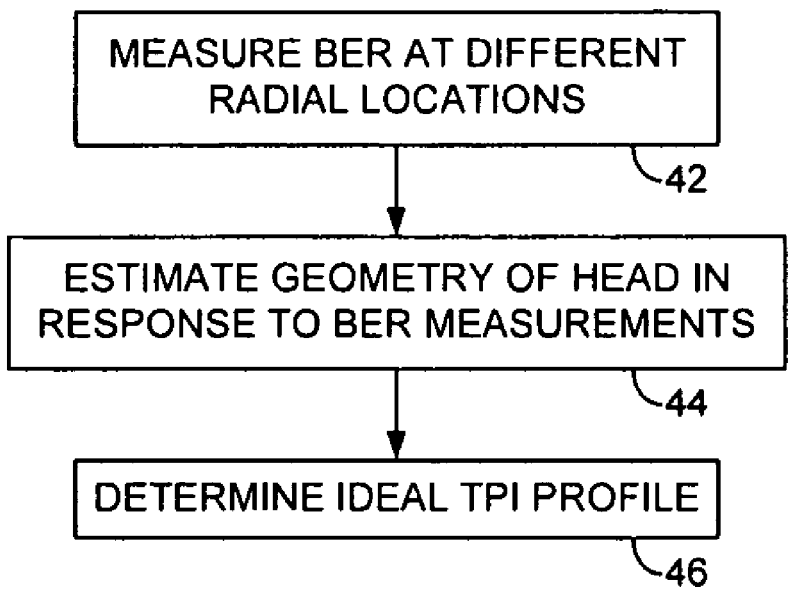
FIG. 5B shows a flow diagram according to an embodiment of the present invention wherein the ideal data TPI profile is determined by estimating a geometry of the head in response to the measured bit error rates at different radial locations.

FIG. 5B is a flow diagram according to another embodiment of the present invention wherein the bit error rate may be measured (step 42) at a few different radial locations (e.g., two inner diameter locations, a middle diameter location, and two outer diameter locations). The geometry of the head may then be estimated (step 44) in response to the data TPI settings that minimize the bit error rate at the different radial locations. For example, a width, bevel angle, and pole height of a write element used in perpendicular magnetic recording may be determined in response to the data TPI settings determined at the different radial locations. The ideal TPI profile over the entire radius of the disk is then determined (step 46) in response to the estimated geometry of the head (e.g., using a lookup table indexed by the estimated head geometry).

Figure 6:
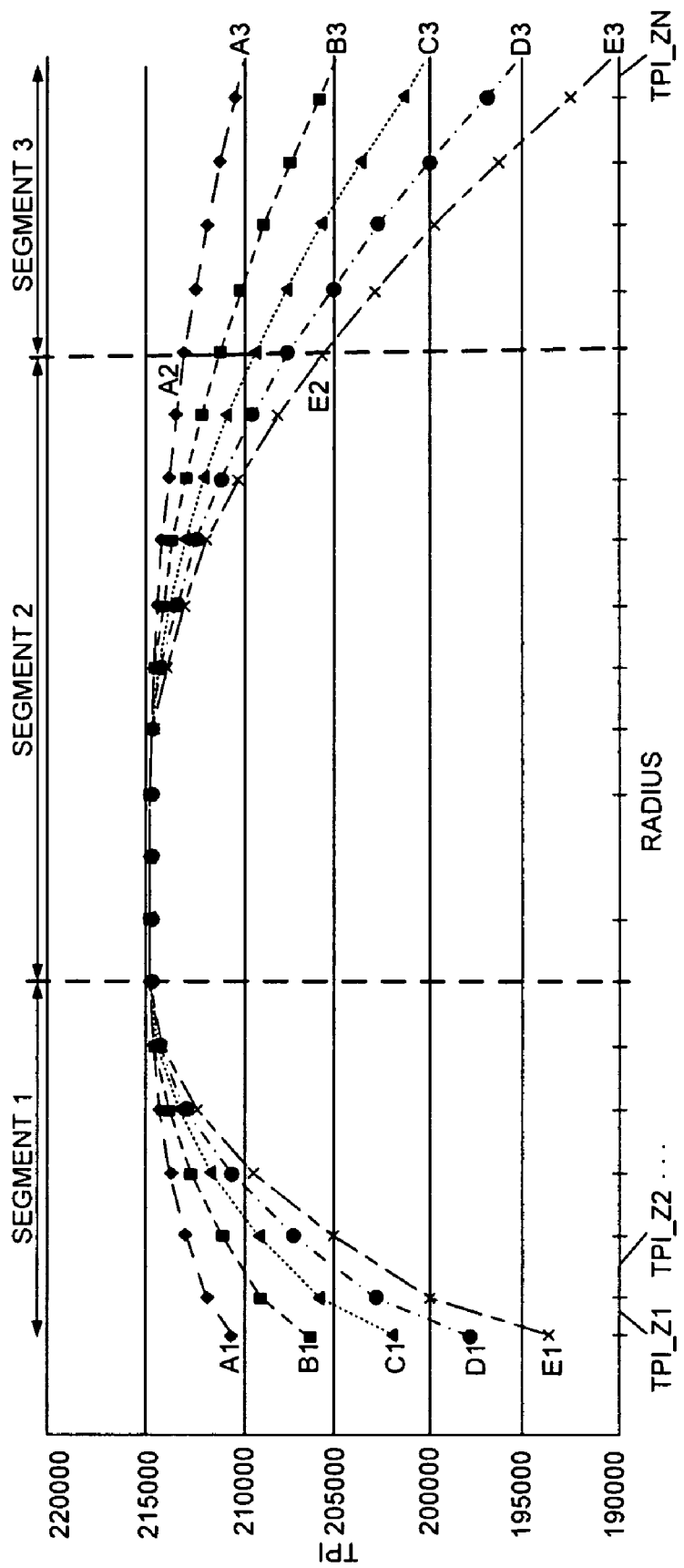
FIG. 6 shows an embodiment of the present invention wherein each predetermined data TPI profile comprises three segments which may be combined in any suitable permutation.

The predetermined data TPI profiles may be divided into any suitable number of segments, wherein the number of available data TPI profiles that can be generated is $N^j$ where N is the number of predetermined data TPI profiles and j is the number of segments. FIG. 6 shows an example embodiment wherein each of five predetermined data TPI profiles (A-E) are divided into three segments at predetermined radial locations. Accordingly, the number of available data TPI profiles that can be generated (the number of permutations of segment combinations) is $5^3=125$. In one embodiment, some combinations are not allowed to avoid an excessive change in the data rate (linear bit density) at the boundary of the segments. For example, combining segment A2 with segment E3 in FIG. 6 may be disallowed since the resulting change in the data rate at the segment boundary may exceed a threshold. Instead, segments B2 and D3 may be combined to generate the actual data TPI profile which may not match the ideal data TPI profile as well, but may satisfy the restriction on the change in data rate at the segment boundary.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of data tracks;

a head actuated over the disk; and control circuitry operable to generate an actual data tracks per inch (TPI) profile for the disk by:
- determining an ideal data TPI profile for the disk; and
- generating the actual data TPI profile that estimates the ideal data TPI profile by combining a first segment of a first predetermined data TPI profile and a second segment of a second predetermined data TPI profile.

2. The disk drive as recited in claim 1, wherein:
the first predetermined data TPI profile comprises first and second TPI zones;
each of the first and second TPI zones define a plurality of data tracks; and
a first data rate of the data tracks in the first TPI zone differs from a second data rate of the data tracks in the second TPI zone.

3. The disk drive as recited in claim 2, wherein:
the second predetermined data TPI profile comprises third and fourth TPI zones;
each of the third and fourth TPI zone define a plurality of data tracks; and
a third data rate of the data tracks in the third TPI zone differs from a fourth data rate of the data tracks in the fourth TPI zone.

4. The disk drive as recited in claim 3, wherein:
the second TPI zone and the third TPI zone define the boundary between the first segment of the first predetermined data TPI profile and the second segment of the second predetermined data TPI profile; and
the second data rate differs from the third data rate by less than ten percent.

5. The disk drive as recited in claim 1, wherein:
the first predetermined data TPI profile comprises first and second TPI zones;
each of the first and second TPI zones define a plurality of data tracks;
each of the first and second TPI zones comprise TPI segments; and
each TPI segment comprises a constant data TPI over a radial segment of the disk.

6. The disk drive as recited in claim 1, wherein the control circuitry is operable to determine the ideal data TPI profile for the disk by measuring a bit error rate at a plurality of different radial locations.

7. The disk drive as recited in claim 6, wherein the control circuitry is further operable to determine the ideal data TPI profile for the disk by estimating a geometry of the head in response to the bit error rate measurements.

8. A method of operating a disk drive, the disk drive comprising a disk comprising a plurality of data tracks, and a head actuated over the disk, the method comprising:
- determining an ideal data tracks per inch (TPI) profile for the disk; and
- generating an actual data TPI profile that estimates the ideal data TPI profile by combining a first segment of a first predetermined data TPI profile and a second segment of a second predetermined data TPI profile.

9. The method as recited in claim 8, wherein:
the first predetermined data TPI profile comprises first and second TPI zones;
each of the first and second TPI zones define a plurality of data tracks; and
a first data rate of the data tracks in the first TPI zone differs from a second data rate of the data tracks in the second TPI zone.

10. The method as recited in claim 9, wherein:
the second predetermined data TPI profile comprises third and fourth TPI zones;
each of the third and fourth TPI zone define a plurality of data tracks; and
a third data rate of the data tracks in the third TPI zone differs from a fourth data rate of the data tracks in the fourth TPI zone.

11. The method as recited in claim 10, wherein:
the second TPI zone and the third TPI zone define the boundary between the first segment of the first predetermined data TPI profile and the second segment of the second predetermined data TPI profile; and
the second data rate differs from the third data rate by less than ten percent.

12. The method as recited in claim 8, wherein:
the first predetermined data TPI profile comprises first and second TPI zones;
each of the first and second TPI zones define a plurality of data tracks;
each of the first and second TPI zones comprise TPI segments; and
each TPI segment comprises a constant data TPI over a radial segment of the disk.

13. The method as recited in claim 8, further comprising determining the ideal data TPI profile for the disk by measuring a bit error rate at a plurality of different radial locations.

14. The method as recited in claim 13, further comprising determining the ideal data TPI profile for the disk by estimating a geometry of the head in response to the bit error rate measurements.

* * * * *